United States Patent
Lau et al.

(10) Patent No.: US 8,602,554 B2
(45) Date of Patent: Dec. 10, 2013

(54) PERIPHERAL FILTERING OPTICAL EYEGLASSES

(75) Inventors: Kenneth H. Lau, La Crescenta, CA (US); Ronald L. Williams, Fall Brook, CA (US)

(73) Assignee: The Aerospace Corporation, El Segundo, CA (US)

(*) Notice: Subject to any disclaimer, the term of this patent is extended or adjusted under 35 U.S.C. 154(b) by 149 days.

(21) Appl. No.: 12/386,282

(22) Filed: Apr. 16, 2009

(65) Prior Publication Data

US 2009/0237613 A1    Sep. 24, 2009

Related U.S. Application Data

(63) Continuation of application No. 11/524,835, filed on Sep. 20, 2006, now abandoned.

(51) Int. Cl.
*G02C 7/10* (2006.01)
*G02C 7/16* (2006.01)

(52) U.S. Cl.
USPC ....... 351/159.63; 351/45; 351/46; 351/159.6; 351/159.64

(58) Field of Classification Search
USPC ............ 351/44–49, 163–165, 159.6, 159.63, 351/159.64, 159.65
See application file for complete search history.

(56) References Cited

U.S. PATENT DOCUMENTS

| | | | | |
|---|---|---|---|---|
| 1,332,410 A | * | 3/1920 | Potts | 351/165 |
| 1,568,900 A | * | 1/1926 | Metcalf | 351/45 |
| 1,637,406 A | * | 8/1927 | Brumder | 473/210 |
| 2,043,840 A | * | 6/1936 | Singer | 351/165 |
| 2,207,411 A | * | 7/1940 | Pierce | 396/544 |
| 5,444,501 A | * | 8/1995 | Aloi et al. | 351/44 |

* cited by examiner

*Primary Examiner* — Scott J Sugarman
(74) *Attorney, Agent, or Firm* — Paul D. Chancellor; Ocean Law

(57) ABSTRACT

A filter or lens for common optical apparatus includes a clear center portion and an attenuating peripheral portion where the peripheral portion attenuates off-axis images and passes on-axis images with high signal to noise ratios yet not completely blocking the off-axis images, which lens is well suited for reducing off-axis glare in the optical apparatus that may be handheld optical apparatus such as binoculars, telescopes, cameras, and eyeglasses.

12 Claims, 5 Drawing Sheets

ANNULAR LENS EYEGLASSES

STAR TRACKER TELESCOPE WITH GRADIENT FILTER

ANNULAR ABSORPTION FILTER

TRIANGULAR ANNULAR FILTER

ANNULAR LENS EYEGLASSES

REDUCED GLARE OPTICS

EDGE ATTENUATING LENS

PATTERNED ATTENUATING LENS

REDUCED GLARE CAMERA

PERIPHERAL FILTERING OPTICAL EYEGLASSES

REFERENCE TO RELATED APPLICATION

The present application is a continuation of U.S. patent application Ser. No. 11/524,835, now abandoned, entitled Peripheral Filtering Optical Apparatus, filed Sep. 20, 2006.

STATEMENT OF GOVERNMENT INTEREST

The invention was made with Government support under contract No. FA8802-00-C-0001 by the Department of the Air Force. The Government has certain rights in the invention.

FIELD OF THE INVENTION

The invention relates to the field of optical imaging systems. More particularly, the invention relates to peripherally attenuating filters and lenses for use in optical systems, such as hand-held eyeglasses, binoculars, telescopes, and cameras.

BACKGROUND OF THE INVENTION

Star tracking telescopes have long been used in spacecraft for determining the location of a spacecraft by reference to imaged stars. A typical tracking system includes a star tracking telescope and can be controlled, moved, and rotated so at to keep the boresight axis pointing at a tracked star so as to keep an image of the star along boresight in a center of a field of view. The field of view may also include images of nearby stars. Images of nearby stars can further enhance on-board positioning systems to determine when the tracked star is the desired star for tracking. Images of the nearby stars can be used to determine a star pattern and hence function as a reference pattern of a cluster of stars where one of the stars within the cluster is to be tracked. Once the desired tracking star has been located and the telescope is moved to maintain tracking of that tracked star, images of the nearby stars may still disadvantageously remain within the field of view.

An image of nearby stars, within the field of view, passes through front-end filters and lenses in a peripheral portion of the front-end filters and lenses while an image of the tracked star enters through the center of the front-end filters or lenses as a tracked star that is tracked. When tracking a tracked star, it is desirable to maintain a high signal to noise ratio especially where the image of the tracked star is a faint image. However, off-axis nearby star images as well as sunlight can disadvantageously inject signal noise into the telescope.

Various prior means have been used to minimize unwanted nearby star and sun tracker noise. Existing tracking telescopes have used elongated cylindrical tubular shades with internal baffling to reduce the amount of off-axis noise. The longer the elongated cylindrical tubular baffled shade, the more that off-axis image noise is reduced. Such shades have been further modified with a shade extension also having a mating tubular cross section but cut so that the shade extension function provides increased shading from above noise images with no shading from below noise shading so as to provide a nonlinear off-axis shading profile. In both cases, the prior shades disadvantageously extended the over all physical length of the telescopes that are intended to fits within a predetermined and dimensionally limited existing spacecraft tracking system. The baffling of the prior shades also have various baffle angles so as to vary the amount of off-axis noise reaching the back end optical sensors. The various baffle angles have a limited angular design, and hence, disadvantageously have a limited amount of noise rejection.

In the photography art, shades have also long been used to limit the amount of off-axis glare from affecting the quality of photographic pictures. Some lenses have been equipped with attenuating lenses to reduce the amount of light received in high glare environments. However, such a shade also decreases the amount of light, and hence, decreases the image quality of the desired image to be photographed. This is similar to common sunglasses where it is desirable to reduce glare from all directions, including on-axis images. Cameras have used concentric lenses and filters where a center portion of the lens is clear and an outer portion is matted so as to fuzz without attenuation the periphery of the resulting photographic image so as to provide an artistic styled photograph where the center portion remains clear.

Handheld binoculars and telescopes have also been equipped with shades to reduce off-axis glares for improved image quality. Handheld binoculars and telescopes have been equipped with opaque filters to reduce image brightness across the entire field of view. Generally, handheld binoculars and telescopes do not use attenuating filters as these optical devices seek, in the main, to magnify a distal object.

Some optical filters and lenses have used fixed or variably sized shutters and sized irises to restrict the field of view, as is well known. In the case of costume eyeglasses, such as those used by children at play, a center portion of a lens is an open aperture while the remaining portion of the lens completely blocks image reception. In other types of costume eyeglasses, young adults have used decorative lenses where ornamental flakes are bonded to the lenses to provide a provocative appearance where the flakes obscure peripheral vision. Many people, especially the aged, have problems with night glare and have used sunglasses while driving a night. However, sunglasses dim on-axis vision that reduces visual acuity along an intended line-of-sight increasing the problems of poor night perception. Star tracking telescopes, and common handheld optical apparatus, such as handheld cameras, binoculars, eyeglasses, and telescopes suffer from the problem of injecting bright off-axis noise into the image quality of on-axis images or suffer from the problem of blocking needed peripheral vision and image reception. These and other disadvantages are solved or reduced using the invention.

SUMMARY OF THE INVENTION

An object of the invention is to provide an optical system attenuating peripheral images.

Another object of the invention is to provide an optical tracking system using a telescope for attenuating peripheral images.

Yet another object of the invention is to provide optical systems using peripheral image attenuating lenses and filters that can be easily manufactured.

Still another object of the invention is to provide optical systems having peripheral image attenuating lenses and filters having identical radial image attenuation in a peripheral portion of the lenses and filters.

A further object of the invention is to provide optical systems having peripheral image attenuating lenses and filters having nonidentical radial image attenuation in a peripheral portion of the lenses and filters.

Yet a further object of the invention is to provide eyeglasses for reducing nighttime glare for improved nighttime driving.

Still a further object of the invention is to provide cameras for reducing photographic glare for improved photographic quality.

The present invention is directed to optical systems having front-end lenses or filters that peripherally attenuate incoming off-axis images so as to preserve the fidelity of on-axis images in the center of a field of view while retraining a portion of the off-axis image. Peripheral off-axis images are attenuated so as to preserve the fidelity of forward vision and on-axis image reception while also receiving attenuated peripheral off-axis images. The purpose is to avoid distortion and maintain high image fidelity of the forward centered region of the field of view while diminishing by attenuation moderately undesirable off-axis images that are not completely blocked so as to preserve some peripheral vision in the periphery of the field of view. This center preservation and periphery attenuation has several applications and can be realized by various manufacturing methods.

The invention is characterized in three aspects. A first aspect is primarily a direct application for minimizing star tracker noise. In the preferred form, the first aspect adapts a gradient optical filter to a conventional star tracker telescope. A second aspect of the invention is directed to various manufacturing processes or making differing types of periphery attenuated front-end lenses and filters. A third aspect of the invention is the application of periphery attenuating lenses and filters to common commercial optical apparatuses such as eyeglasses and cameras.

In the first aspect, an image tracking system, such as a star tracking system, uses a star tracker telescope. The star tracking telescope tracks a foreign body by moving an optical boresight axis that remains in alignment and in the direction of that tracked body where the tracking system uses periphery attenuating filters or lenses. In the preferred form, a star tracker telescope is pointed directly toward a tracked star for providing a high intensity and unattenuated image of that tracked star. The tracked star image passes through the center of a front-end filter for receiving a high fidelity image of that tracked star so as to maintain maximum signal strength for star tracking. Off-axis star images are received through the periphery of the front-end filter. The off-axis images are attenuated in signal strength so that the off-axis star images can still be seen but without substantial glare interference to the tracked star image, so that, reference to the off-axis star can be maintained without degrading the image of the on-axis star image that is tracked for improved star-tracking performance. The proposed filtering is preferably by gradient or uniform filtering that has zero attenuation in the center clear portion of the filter but has equicircumferential radial attenuation in a periphery portion of the filter where the amount of attenuation has identical attenuation profiles along any identical radially extending line from the center and through the periphery portion of the filter.

In the second aspect of the invention, the periphery attenuating filters or lenses have nonidentical attenuation profiles along any identical radially extending line from the center through the periphery portion of the lenses or filters. In an exemplar form, the periphery portion is coated with a solid reflecting coating for blocking all transmissions through selected portions of the periphery portion. The coating is configured during manufacture in the shape of triangular wedges equiangularly disposed in the periphery portion. The wedges radially extend from the outer circumference and point towards the center of the filter that still retains a center clear transmissive portion providing an inner portion of transparency and an outer portion of reflection. These reflecting triangular wedges provide effective gradient attenuation but can be easily realized through manufacture of solid reflective coatings.

In the third aspect of the invention, the periphery attenuating filters or lenses are applied to nontracking optical systems, such as common eyeglasses and photographic cameras, generally having the purpose of reducing periphery glare. In the case of eyeglasses, the lenses of the eyeglasses have a periphery attenuating portion so as to reduce periphery glare that may, for example, be distracting for nighttime automobile drivers, yet preserve enough of the periphery visions for visual perception similar to sunglass intensity attenuation. These sunglasses preserve the forward center view for maintaining full forward vision acuity for improved safety during driving by reducing the common affliction of night blindness and while reducing glare. In the case of photographic cameras, the attenuating periphery portion of a front-end filter or lenses prevents side lighting from producing glare that adversely affects the image quality in the center of the field of view from improved accurate and artistic photography.

The periphery attenuation front-end filters and lenses can be used to enhance image tracking, human visual perception, and photographic quality. These and other advantages will become more apparent from the following detailed description of the preferred embodiment.

DETAILED DESCRIPTION OF THE PREFERRED EMBODIMENT

Figure 1:
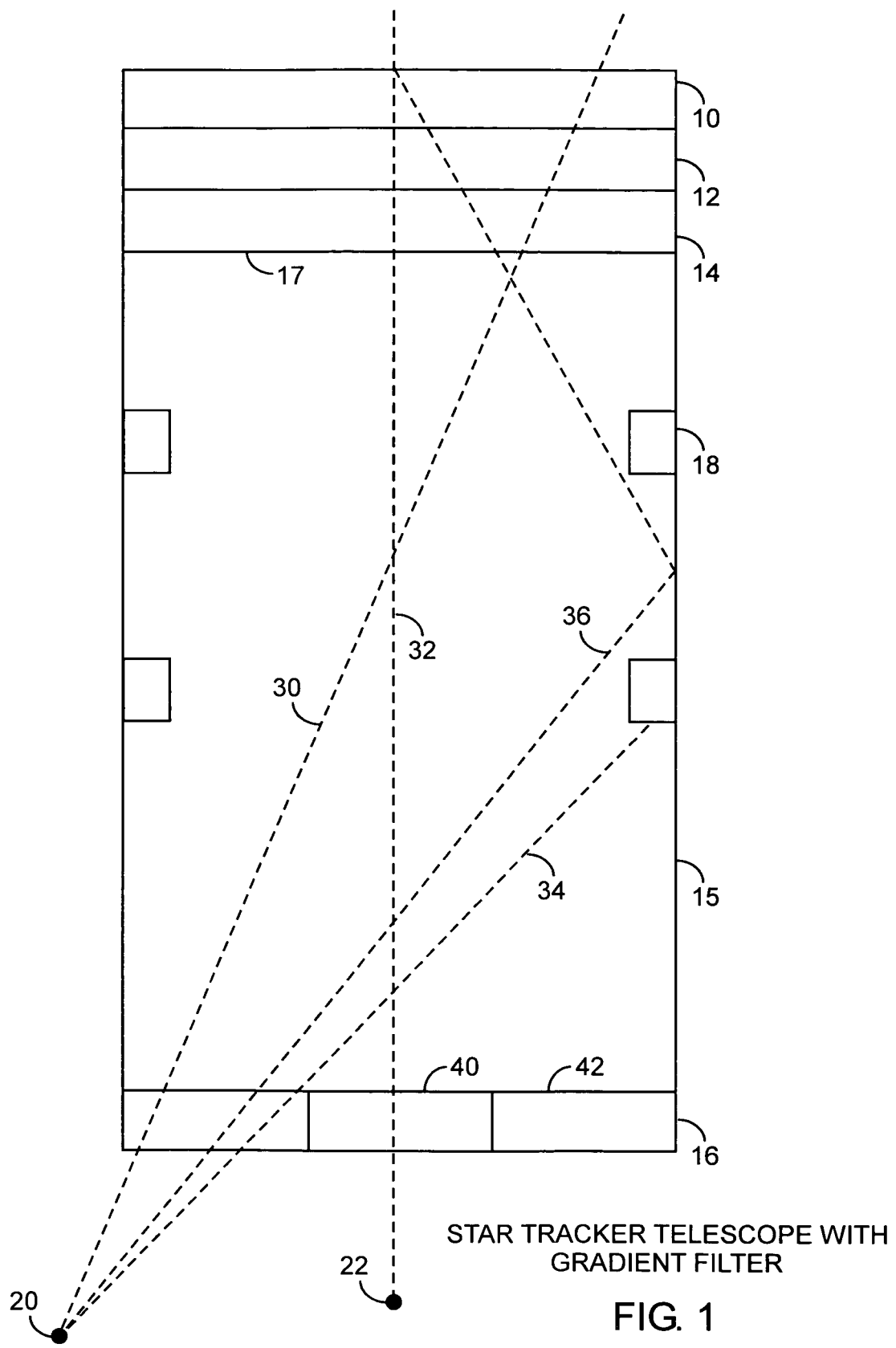
FIG. 1 is a diagram of a star tracker telescope with a gradient filter.

An embodiment of the invention is described with reference to the figures using reference designations as shown in the figures. Referring to FIG. 1, a star tracker telescope includes an optical sensor 10, a bandpass filter 12, an optical lens 14, a tubular shade 15, and an annular filter 16 for focusing received images upon a focal plane 17. The tubular shade 15 may include baffles 18. A bright off-axis star image 20 and a dim on-axis star image 22 provide optical images. The images pass through the annular filter 16, the focal plane 17, and optical lens 14 for activating the optical sensor 10 that provides electronic images of the bright off-axis star image 20 and the dim on-axis star image 22 for star tracking. The bright off-axis image 20 could be an image of the sun or a distal bright star. The dim on-axis star image 22 could be a dim remote star that is to be tracked.

The bright star off-axis image 20 passes through the tubular shade 15 along an attenuated bright star optical path 30 to the focal plane 14, lens 12, and sensor 10. The dim star image 22 passes along a dim star optical path 32 to the focal plane 14, lens 12, and sensor 10. The bright star off-axis image 20 also passes through the tubular shade 15 along an absorbed bright star optical path 34 where a portion of the bright star off-axis image is absorbed by the baffles 18. The bright star off-axis image 20 also passes through and is reflected by the tubular shade 15 along a reflected bright star optical path 36, to the focal plane 14, lens 12, and sensor 10.

The annular filter 16 includes a clear circular center portion 40 passing the dim on-axis star image 22 along the dim star optical path 32. The clear circular center portion 40 is completely transmissive and does not attenuate the signal strength of dim on-axis star image 22. The annular filter 16 further includes an attenuating annular portion 42 that attenuates the signal strength of the bright star off-axis image 20 along the attenuated bright star optical path 30, absorbed bright star optical path 34, and the reflected bright star optical path 36. Hence, an attenuating annular portion 42 of the annular filter 16 serves to attenuate the signal strength, but does not completely block the signal of the bright star off-axis image 20. Concurrently, the clear circular center portion 40 of the annular filter 16 serves to passes the dim on-axis star image 22. In this manner, the optical sensor 10 receives the dim on-axis star image 22 with maximum signal strength while receiving the bright star off-axis image 20 with reduced signal strength.

Figure 2:
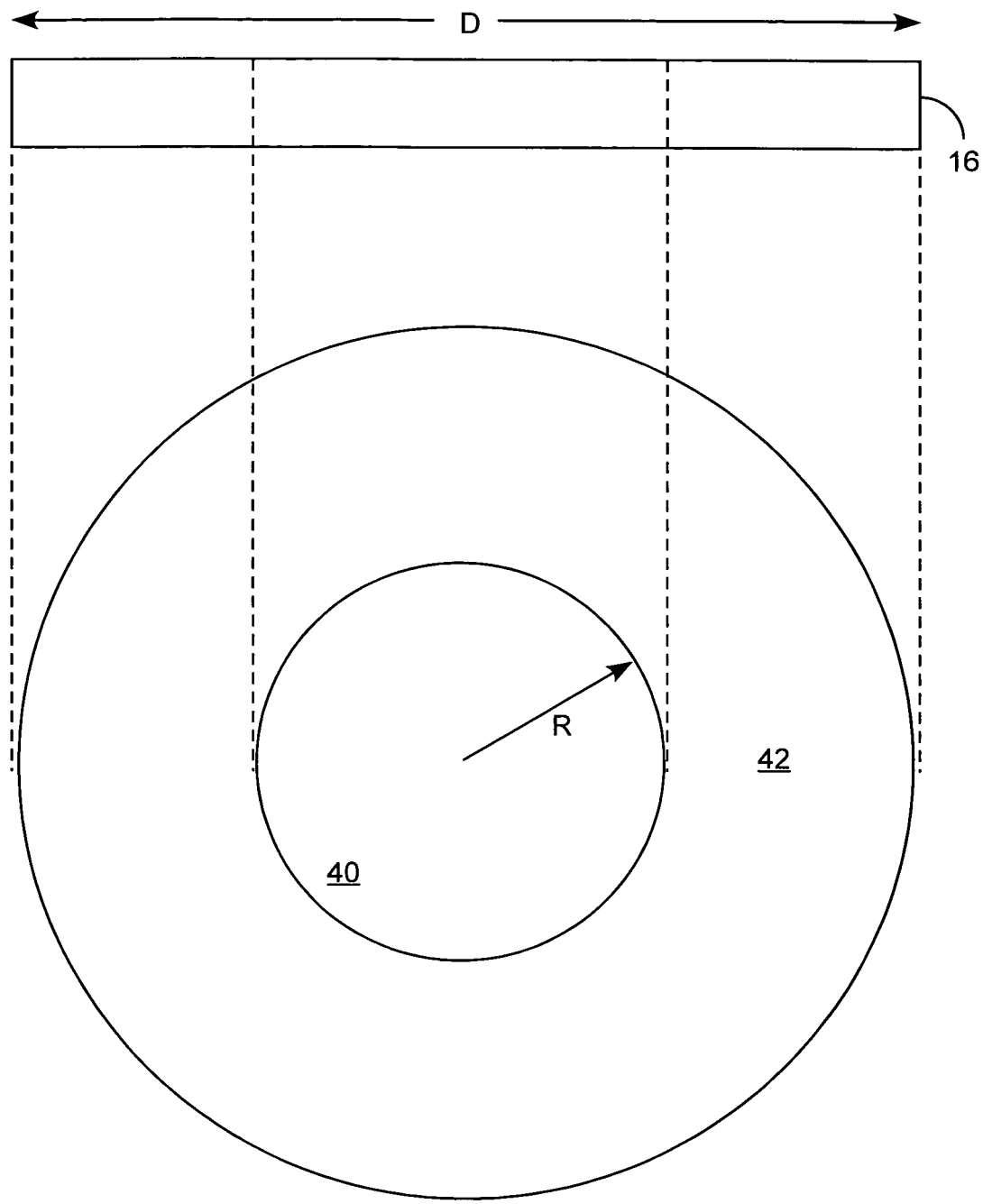
FIG. 2 is a diagram of an annular absorption filter.

Referring to FIGS. 1 and 2, and more particularly to FIG. 2, the annular filter 16 is an annular absorption filter having the center clear portion 40 and the attenuating annular portion 42. The clear portion 40 is centered in the filter 16 and is defined by a radius R. The attenuating annular portion 42 is an outer portion defined by the circumference of the clear portion 40. The outer circumference of the filter 16 is defined by a diameter D. In one form of the invention, the attenuating annular portion 42 is defined by an identical attenuation profile that is equal and identical along any radial line extending from the center of the filter 16 to the circumference of the filter 16. More preferably, the attenuation profile of the attenuating annular portion 42 could be a uniform profile providing uniform attenuation along any radial line where the attenuation is equal at all points along all radial lines through the portion 42. The attenuation profile could be a gradient profile providing linearly increasing or decreasing amounts of attenuation at points along all radial lines through the portion 42.

Figure 3:
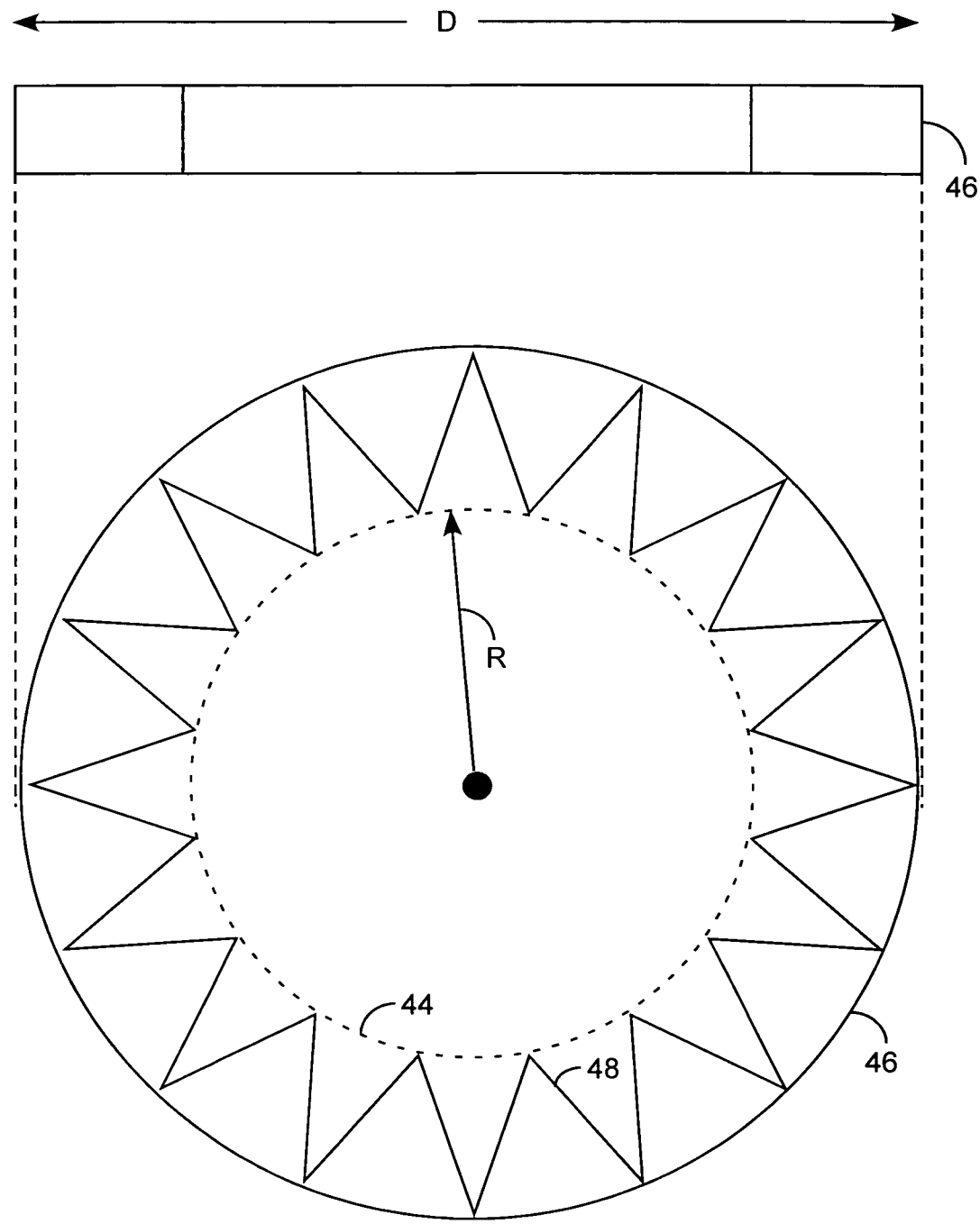
FIG. 3 is a diagram of a triangular annular absorption filter.

Referring to FIGS. 1 through 3, and more particularly to FIG. 3, another preferred form of the invention is a triangular annular filter that is also an attenuating annular filter having a nonidentical amount of attenuation along the radial lines. In this form, the annular filter 16 has triangular density portions 48 that extend from an inner R diameter 44 to an outer circumference having an outer D diameter 46. The triangular portions 48 are a plurality of like triangular portions being isosceles triangles or wedges having tips at the inner R diameter 44 and a base running substantially in coincident alignment with the circumference having an outer D diameter of the filter 16. The triangular portions 48 can provide uniform or gradient attenuation. One particular case of uniform attenuation of the triangular portions 48 is reflection providing complete attenuation. In operation, the triangular portions 48 collectively function to attenuate the bright off-axis star images even when the triangular portions 48 are reflective. Uncoated clear optics is disposed in the center while the triangular portions 48 are disposed on the periphery of the filter 16. The triangular portions 48 could be easily made by reflective manufacturing masks producing silver mirrored surfaces.

In operation, the annular filters 16 may take various forms, such as with identical or nonidentical radial attenuation profiles, but at a minimum has an annular outer portion 42 for attenuating the off-axis images and a clear center portion for passing on-axis images. As a further enhancement, and at a minimum, the center portion could also have some attenuation filter so long as it is distinct from and less attenuation of the outer annular portion passing an attenuated remainder of the off-axis image. This dual attenuation feature is well suited for star tracking telescopes, but could also be applied to other optical apparatus, such as personal eyeglasses, binoculars, telescopes, and cameras.

Figure 4:
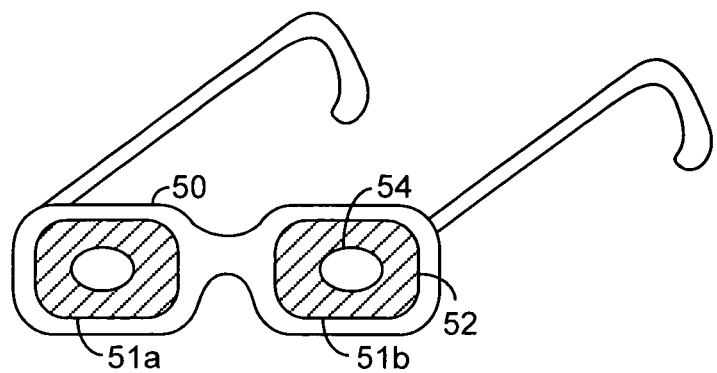
FIG. 4 is a diagram of annular lens eyeglasses.

Referring to FIG. 4, a pair of annular lenses are disposed in eyeglasses including an eyeglasses frame 50 supporting a right eyeglass lens 51a and a left eyeglass lens 51b. Each of the lenses 51a and 51g include an annular attenuating portion 52 for attenuating off-axis images and a clear center portion 54. The lenses 51a and 51b need not be circular. The lenses 51a and 52b may be for example, substantially rectangular in perimeter shape but have two distinct portions, the center portion 54 that may be, for example, oval in shape, and an outer portion 54 that may have an inner oval edge and an outer rectangular edge. The center portion 54 and annular attenuating portion 52 would have respective differences in the respective amounts of attenuation. In the preferred form, the inner portion is transparent and the outer portion is opaque.

Figure 5:
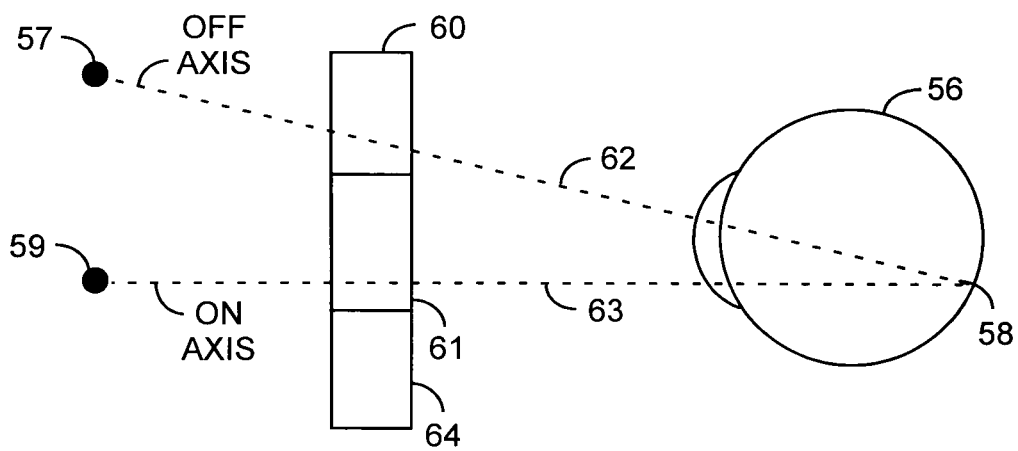
FIG. 5 is a diagram of reduced glare optics.

Referring to FIG. 5, a human eyeball 56 functions to receive both an off-axis image 57 and on-axis image 59 for human perception using a retina focal surface 58 in the eyeball 56. The off-axis image 57 may be a glaring image and the on-axis image 59 may be a target image. An exemplar eyeglass lens 60 includes a clear circular center portion 61 through which passes the on-axis image along an on-axis target optical path 63, and includes a lens attenuating annular portion 64 through which passes the off-axis image along an off-axis glaring optical path 62. The lens 60 may be a prescription lens for providing both corrective vision and off-axis attenuation.

Figure 6:
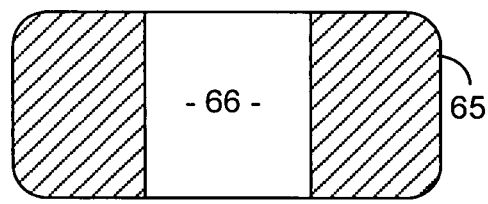
FIG. 6 is a diagram of an edge-attenuating lens.

Referring to FIG. 6, an edge-attenuating lens has opposing side-edge attenuating portions 65 and a clear center portion 66 for attenuating left and right off-axis images while not attenuating top and bottom off-axis images. The edge-attenuating lens can have various other possible preferred forms, such as attenuating up and bottom off-axis images. The edge-attenuating lens is characterized as having a nonidentical attenuation profile along all radial lines extending from the center of the lens 64.

Figure 7:
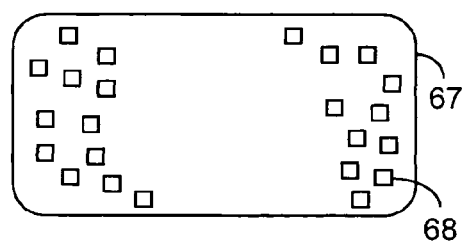
FIG. 7 is a diagram of a patterned attenuating lens.

Referring to FIG. 7, a patterned attenuating lens 67 is configured with attenuating squares 68 that may be partially transmissive or completely reflective. The patterned attenuating lens 67 is also characterized as having a nonidentical attenuation profile along all radial lines extending from the center of the lens 67. Various shapes and prescriptions can be used in many possible variants so long as an outer portion of the lens 67 attenuates in some measure more than a center portion of the lens having a distinctly differing lesser amount of attenuation, such as transparency or significantly reduced attenuation. For example, the lens could be part of prescription sunglasses having a much more darker and opaque outer portion for increased off-axis attenuation as compared to less on-axis attenuation for defining variants of annular filtering. The eyeglasses 50 could be used by automobile drivers suffering from poor night vision. Unwanted off-axis images tend to glare and degrade perception of the on-axis images. The eyeglasses 50 would not attenuate on-axis red tail lights of cars in a driver's immediate front, but would attenuate off-axis periphery light from headlights of on-coming traffic for improve driving safety, yet remain enough of the off-axis image for visual periphery perception and safety.

Figure 8:
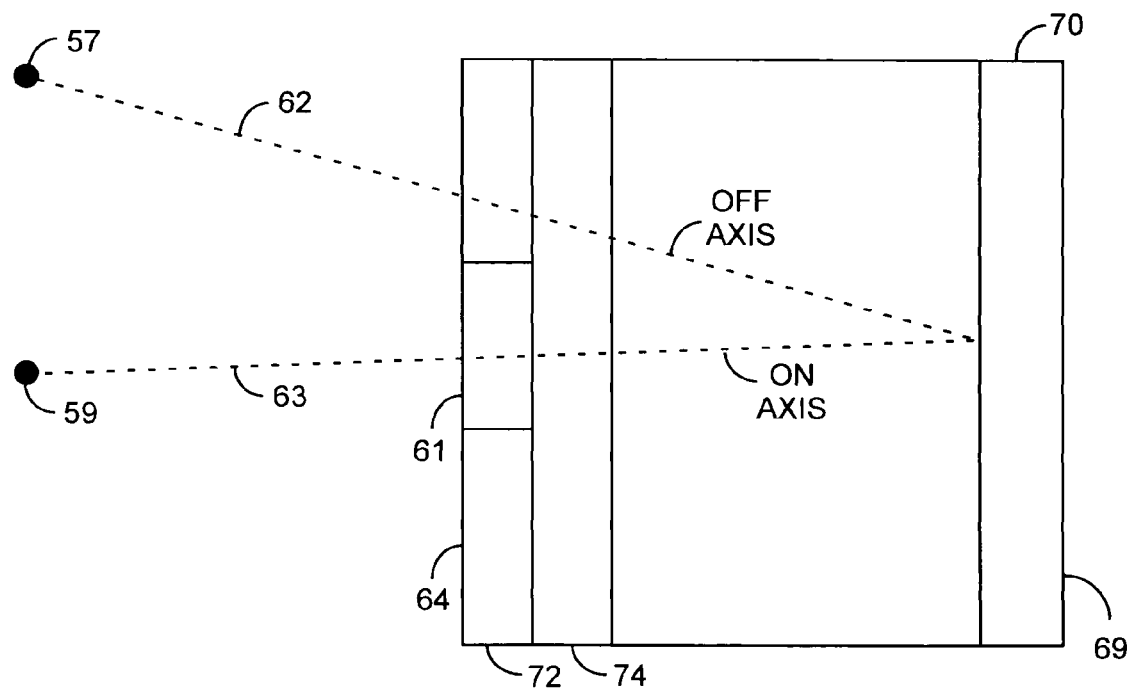
FIG. 8 is a diagram of a reduced glare camera.

Referring to FIG. 8, annular filtering can be applied to many other optical apparatus, such as a glare reduction camera 69 including an image sensor 70 which may be for example, a CCD electronic sensor or photographic film. The glare reduction camera 69 would include a camera annular filter 72 and a camera lens 74. The annular filter 72 would preferably include a clear portion 61 for passing by transparency an on-axis image 59 along the on-axis optical path 63 for photographing the on-axis image 59. The annular filter 72 would further include an outer annular portion 64 for attenuating along the off-axis optical path 62 the off-axis image 57. In so doing, the photographic image would reduce light intensity of the off-axis image thereby reducing unwanted glare during photography while retaining a clear and bright photograph of the on-axis image. The application of the off-axis periphery attenuation can equally be applied generally to other optical apparatus including mechanical handheld binoculars and telescopes.

The present invention is directed to an optical apparatus including a front-end lens or filter that distinctly attenuates an off-axis image more than an on-axis image. In one form, an optical filter is mounted on the light shade with a clear transparent center portion in the center and with a gradient or uniform attenuating outer portions that would attenuate the stray light effects for improved star tracking of an on-axis image passing through the center portion. There are many advantages to reducing but not completely eliminating glint, glare, stray, or bright periphery light in various optical systems. Peripheral-attenuating optical systems are applicable to star trackers, as well as Earth sensors, horizon sensors, sun sensors, optical telescopes, and infrared telescopes. Peripheral-attenuating optical filters and lenses can in general be applied to any optical systems, including commercial cameras, eyeglasses, binoculars, hobby telescopes, and video systems. Those skilled in the art can make enhancements, improvements, and modifications to the invention, and these enhancements, improvements, and modifications may nonetheless fall within the spirit and scope of the following claims.

What is claimed is:

1. Optical eyeglasses, the apparatus comprising,
a filter having an inner portion and an outer portion,
the outer portion extending to the periphery of the filter and for attenuating an off-axis image,
the off-axis image being a peripheral image passing through the outer portion,
the filter further comprising an inner portion for passing the on-axis image, the inner portion attenuating the on-axis image lesser than the attenuation of the off-axis image passing through the outer portion, and
a frame for supporting the filter, the frame adapted for resting on a nose and a pair of ears of a human being,
wherein, the filter comprises two lenses and the frame is adapted for use in eyeglasses for providing vision for a human being, the lenses having a focal point in eyeballs of the human being.

2. Optical eyeglasses, the apparatus comprising,
a filter having an inner portion and an outer portion,
the outer portion extending to the periphery of the filter and for attenuating an off-axis image,
the off-axis image being a peripheral image passing through the outer portion,
the filter further comprising an inner portion for passing the on-axis image, the inner portion attenuating the on-axis image lesser than the attenuation of the off-axis image passing through the outer portion, and
a frame for supporting the filter, the frame adapted for resting on a nose and a pair of ears of a human being,
wherein, the filter comprises two lenses, the lenses being corrective lenses, and the frame is adapted for use in a pair of eyeglasses for providing vision for a human being, the lenses having a focal point in eyeballs of the human being.

3. A method of improving eyeglasses, the method comprising the steps of,
providing a filter having an inner portion and an outer portion,
locating more than two attenuating geometric shapes on the filter to attenuate an off-axis image passing through the filter outer portion,
passing an on-axis image through the filter inner portion,
as compared to the on-axis image, attenuating the off-axis image to a greater degree, and
supporting the filter with a frame adapted for resting on a nose and a pair of ears of a human being.

4. The method of claim 3 wherein the attenuating geometric shapes are reflective.

5. The method of claim 3 wherein the attenuating geometric shapes are reflective on the image side but, through the lens, are attenuating and viewable by a human being.

6. Optical eyeglasses, the apparatus comprising,
a filter having an inner portion and an outer portion,
the outer portion extending to the periphery of the filter and for attenuating an off-axis image,
the off-axis image being a peripheral image passing through the outer portion,
the filter further comprising an inner portion for passing the on-axis image, the inner portion attenuating the on-axis image lesser than the attenuation of the off-axis image passing through the outer portion,
a frame for supporting the filter, the frame adapted for resting on a nose and a pair of ears of a human being and the filter comprising two lenses,
the outer portion comprises two edge portions for reducing glare from the off-axis image while not attenuating top and bottom off-axis images, and
the frame is adapted for use in a pair of eyeglasses for providing vision for a human being, the lenses having a focal point in eyeballs of the human being.

7. A method of improving eyeglasses, the method comprising the steps of,
providing an uncolored filter including an outer portion and an inner portion,
passing an on-axis image with the inner portion,
attenuating an off-axis image with the outer portion,
as compared to the on-axis image, attenuating the off-axis image to a greater degree,
supporting the filter with a frame adapted for resting on a nose and a pair of ears of a human being, and
including attenuating shapes in the outer portion.

8. The method of claim 7 wherein the attenuating shapes include a plurality of reflective attenuating shapes, each reflective attenuating shape framed within an otherwise transparent region of the outer portion.

9. A method of improving eyeglasses, the method comprising the steps of,
providing an uncolored filter including an outer portion and an inner portion,
passing an on-axis image with the inner portion,
attenuating an off-axis image with the outer portion,
as compared to the on-axis image, attenuating the off-axis image to a greater degree,
supporting the filter with a frame adapted for resting on a nose and a pair of ears of a human being, and
providing in the outer portion a plurality of equiangularly spaced opaque triangular portions and a plurality of equiangularly spaced transparent triangular portions.

10. A method of improving eyeglasses, the method comprising the steps of,
providing an uncolored filter including an outer portion and an inner portion,
passing an on-axis image with the inner portion,
attenuating an off-axis image with the outer portion, as compared to the on-axis image, attenuating the off-axis image to a greater degree,
supporting the filter with a frame adapted for resting on a nose and a pair of ears of a human being, and
providing in the outer portion an attenuation profile that varies along any radial line from a center in the inner portion of the filter through the filter's outer portion.

11. A method of improving eyeglasses, the method comprising the steps of,
providing an uncolored filter including an outer portion and an inner portion,
passing an on-axis image with the inner portion,
attenuating an off-axis image with the outer portion,
as compared to the on-axis image, attenuating the off-axis image to a greater degree,
supporting the filter with a frame adapted for resting on a nose and a pair of ears of a human being,
providing in the outer portion an attenuation profile that varies along any radial line from a center in the inner portion of the filter through the filter's outer portion, and
wherein the variation of the attenuation profile is stepwise.

12. The method of claim 11 wherein the variation of the attenuation profile is continuous.

\* \* \* \* \*